United States Patent
Solanki et al.

(10) Patent No.: US 8,391,240 B2
(45) Date of Patent: Mar. 5, 2013

(54) UPDATING AN IGMP MEMBERSHIP REPORT WHEN A WIRELESS CLIENT DEVICE ROAMS ACROSS IP SUBNETS

(75) Inventors: Kunal K. Solanki, Karnataka (IN); Somesh Agrawal, Karnataka (IN)

(73) Assignee: Symbol Technologies, Inc., Holtsville, NY (US)

( * ) Notice: Subject to any disclaimer, the term of this patent is extended or adjusted under 35 U.S.C. 154(b) by 640 days.

(21) Appl. No.: 12/648,834

(22) Filed: Dec. 29, 2009

(65) Prior Publication Data
US 2011/0158208 A1 Jun. 30, 2011

(51) Int. Cl.
*H04W 4/00* (2009.01)
*H04L 12/28* (2006.01)
*H04J 4/00* (2006.01)

(52) U.S. Cl. ......... 370/331; 370/338; 370/390; 370/436

(58) Field of Classification Search .................. 370/331, 370/338
See application file for complete search history.

(56) References Cited

U.S. PATENT DOCUMENTS

| | | | |
|---|---|---|---|
| 7,042,865 B1 | 5/2006 | Meier et al. | |
| 7,173,922 B2 | 2/2007 | Beach | |
| 7,173,923 B2 | 2/2007 | Beach | |
| 7,301,946 B2 | 11/2007 | Meier et al. | |
| 2005/0157741 A1* | 7/2005 | Wu et al. | 370/432 |
| 2005/0216601 A1* | 9/2005 | Yost | 709/239 |
| 2006/0053335 A1* | 3/2006 | Hille | 714/4 |
| 2007/0109994 A1 | 5/2007 | Beach | |
| 2007/0177435 A1 | 8/2007 | Beach | |
| 2008/0146230 A1* | 6/2008 | Pandian et al. | 455/436 |
| 2009/0006585 A1* | 1/2009 | Chen | 709/220 |
| 2009/0034470 A1 | 2/2009 | Nagarajan et al. | |
| 2009/0052362 A1* | 2/2009 | Meier et al. | 370/311 |
| 2009/0086689 A1* | 4/2009 | Hunt et al. | 370/338 |
| 2009/0257432 A1* | 10/2009 | Yamaguchi et al. | 370/390 |

OTHER PUBLICATIONS

File History for U.S. Appl. No. 11/831,781, filed Jul. 31, 2007.

* cited by examiner

*Primary Examiner* — Brandon Renner (57) ABSTRACT

A network is provided that includes a first WLAN infrastructure device (WID) that defines a first subnet, and a wireless client device (WCD) that is initially associated with the first WID. The WCD associates with a "current" WID when the wireless client device roams from the first subnet to a second subnet defined by the current WID. Upon successful association, the current WID unicasts a first IGMP query message (IGMPQM) to the WCD that has a MAC header including a destination MAC address that is set to a MAC address of the WCD.

18 Claims, 6 Drawing Sheets

UPDATING AN IGMP MEMBERSHIP REPORT WHEN A WIRELESS CLIENT DEVICE ROAMS ACROSS IP SUBNETS

FIELD OF THE DISCLOSURE

The present invention generally relates to computer networks and, more particularly, to methods, systems and apparatus for updating an Internet Group Management Protocol (IGMP) membership report when a wireless client device roams across Internet Protocol (IP) subnets in a Wireless Local Area Network (WLAN).

BACKGROUND

Emerging multimedia applications such as online streaming video, local area network (LAN) TV, collaborative computing, gaming and desktop conferencing depend on the ability to send the same information from one host to a plurality of other hosts (also referred to as "one to many") or from a plurality of hosts to a plurality of other hosts (also referred to as "many to many"). IP multicasting was developed as an efficient means to support such multicast communications. As used herein, the term "multicasting" refers to directing the same information packets to multiple destinations at the same time. In a multicast communication, information is communicated to more than one communication device (also referred to as nodes or stations), each of which belongs to a particular multicast group. For example, a multicast server/router can communicate multicast data streams that are sent with a destination IP address of an IP multicast group. By contrast, the term "unicasting" refers to sending a separate copy of a communication to each individual device destination. Some of the benefits of IP Multicasting include: 1) the sender only has to send out one copy of the information packet instead of many, 2) the information is delivered in a more timely, synchronized fashion because all destinations receive the same source packet, 3) multicasting can be used to send information to destinations whose individual addresses are unknown (similar to a broadcast), and 4) it reduces the overall number of packets on the network (that is, one multicast packet sent instead of many unicast packets).

The Internet Group Management Protocol (IGMP) refers to a communications protocol used to manage the membership of Internet Protocol (IP) multicast groups. IGMP is used by IP hosts to manage their dynamic multicast group membership; it is also used by connected routers to discover these group members. IGMP can be used to automatically control and limit the flow of multicast traffic through the network. IGMP is used to establish multicast group memberships to effectively eliminate multicast traffic on segments that are not destined to receive this traffic and thus allows for more efficient use of resources. Various "Request for Comments" (RFC) documents by the Internet Engineering Task Force (IETF) define different versions of IGMP. As used herein, the term Request for Comments (RFC) is used to refer to a memorandum published by the Internet Engineering Task Force (IETF) describing methods, behaviors, research, or innovations applicable to the working of the Internet and Internet-connected systems. The IETF develops and promotes Internet standards. The official source for RFCs on the World Wide Web is the RFC Editor. One may retrieve almost any individual, published RFC, via a URL at: http://www.rfc-editor.org/rfc/ or http://www.ietf.org/rfc.html. In addition, one may obtain copies of RFCs by contacting: IETF Secretariat, c/o Association Management Solutions, LLC (AMS), 48377 Fremont Blvd., Suite 117, Fremont, Calif. 94538, USA. All RFCs referred to herein have been published at the time this application was filed and are incorporated herein by reference in their entirety. As used herein, "Internet Group Management Protocol (IGMP)" refers to a communications protocol used to manage the membership of Internet Protocol multicast groups. IGMP is used by IP hosts and adjacent multicast routers to establish multicast group memberships. There are three versions of IGMP, as defined by IETF RFCs: IGMP v1 is defined by RFC 1112, IGMP v2 is defined by RFC 2236 and IGMP v3 is defined by RFC 3376, each of which are incorporated herein by reference in their entirety.

IGMP manages multicast traffic throughout networks with the use of special multicast queriers and hosts that support IGMP. As used herein, a "querier" is a network device (e.g., a router, wireless switch, or other type of device that is designed to behave as a querier) that sends periodic IGMP query messages.

IGMP identifies members of the multicast group per "subnet" and provides messages by which hosts can join and leave multicast groups. More specifically, the queriers and hosts can use message structures that are commonly called an IGMP query message, an IGMP report message, and an IGMP leave group message. IGMP query messages (also referred to as "membership queries") are used by queriers to discover which network devices are members of a given multicast group. IGMP query messages are sent to determine which multicast addresses are of interest to systems attached to its network. General IGMP query messages are periodically sent to refresh the group membership state for all systems on its network. By contrast, group-specific IGMP query messages are used to determine the reception state for a particular multicast address. Group-and-source-specific IGMP query messages allow the querier to determine if any systems desire reception of messages sent to a multicast group from a source address specified in a list of unicast addresses. IGMP report messages are sent by hosts in response to queries to inform the querier of a host's membership. The host can also use the report message to join a new group. IGMP leave group messages are sent when the host desires to leave the multicast group.

A wireless local area network (WLAN) generally includes one or more access points (APs) designed to communicate with wireless client devices. As the number of APs increases, the network can become difficult to manage. To help alleviate this problem, a master controller (also referred to as a "wireless switch") can be added to the network. Each wireless switch has a number of ports which allow the wireless switch to be coupled to multiple APs. A wireless switch controls some or all of the APs in the network, and data going to or from the APs flow through the wireless switch. Moreover, the access points can then be simplified by performing many of the functions of a conventional access point at the wireless switch. These simplified access points are referred to herein as "access ports" to differentiate them from conventional access points.

When IGMP is implemented at a wireless switch (i.e., an IGMP enabled wireless switch), the wireless switch limits multicast traffic by monitoring IGMP traffic (or by performing "IGMP snooping") and learning which of its associated wireless client devices belong to particular multicast groups. When a wireless switch receives multicast traffic, it determines whether any of its associated wireless client devices belong to the particular multicast group that corresponds to that multicast traffic. If there is at least one wireless client device that belongs to the corresponding multicast group, then the wireless switch allows that multicast traffic to be sent to access ports and transmitted over-the-air.

To maintain up-to-date multicast membership tables, the wireless switch periodically sends out an IGMP query message that is eventually multicast over-the-air via access ports that are coupled to that wireless switch.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

When a wireless client device has recently roamed to a new subnet, an IGMP Snooping Table maintained by the new wireless switch (or Access Point) for that subnet might not be up-to-date to reflect multicast membership for the "roamed" wireless client device. Delivery of a multicast IGMP query message to that wireless client device can not be guaranteed since a multicast IGMP query message could be corrupted in some cases, and there is no acknowledgement mechanism for a multicast packet. This can be problematic since the "newly associated" or "roamed" wireless client device might not receive a multicast IGMP query message and as a result a multicast traffic stream that should be received by the "newly associated" or "roamed" wireless client device can be interrupted.

To increase the reliability of multicast traffic over wireless media, it would be desirable to increase the reliability of an IGMP query message sent to a wireless client device when it roams between subnets and associates with a new wireless switch. In addition, it would also be desirable to avoid flooding the new wireless switch with IGMP report messages. In other words, it would be desirable to prevent the new wireless switch from unnecessarily receiving IGMP report messages from all wireless client devices in the subnet simply because a wireless client device has recently roamed to the subnet associated with that wireless switch.

In accordance with the disclosed embodiments, techniques are provided for improving the reliability of an IGMP query message sent to a wireless client device when the wireless client device roams between subnets and associates with a new WLAN infrastructure device (e.g., a wireless switch or Access Point). A network is provided that includes a first WLAN infrastructure device (WID) that defines a first subnet, and a wireless client device (WCD) that is initially associated with the first WID. The WCD associates with a "current" WID when the wireless client device roams from the first subnet to a second subnet defined by the current WID. Upon successful association, the current WID unicasts a first IGMP query message (IGMPQM) to the WCD that has a Media Access Control (MAC) header including a destination MAC address that is set to a MAC address of the WCD.

In one implementation, where the WIDs are wireless switches, when a wireless client device roams to a new subnet and associates with a new or "current" wireless switch, the current wireless switch generates a unicast IGMP query message that is destined for the wireless client device (e.g., has a destination MAC address of the wireless client device). The unicast IGMP query message is relayed to one or more access ports coupled to the current wireless switch where it is transmitted over-the-air or "unicast" only to the wireless client device, and only that particular wireless client device will respond with an IGMP report message. In other words, because the IGMP query message is unicast to the wireless client device, the IGMP query message will be processed only by that particular wireless client device. In addition, because the IGMP query message is unicast, delivery of the IGMP query message to the newly associated (or "roamed") wireless client device is highly reliable and/or guaranteed. This helps ensure that multicast membership tables (also referred to as IGMP snooping tables) maintained at the new wireless switch can be updated with more accurate information, and that the newly associated or roamed wireless client device continues to receive appropriate multicast traffic stream(s) without interruption even when roaming. As a result, the reliability of multicast traffic can be improved with respect to the newly associated (or "roamed") wireless client device. Further, because the IGMP query message is unicast it will be discarded by other wireless client devices that receive it. As such, the new wireless switch can update and maintain its multicast membership table (i.e., with the multicast membership information for that roamed wireless client device) without being flooded by IGMP report messages from other wireless client devices in the subnet that belong to a particular multicast group. In other words, the unicast IGMP query message will not trigger generation of IGMP report messages by other wireless client devices that received it.

In accordance with one embodiment, a method is provided for updating an IGMP membership report. In accordance with this method, when a wireless client device roams from a first subnet associated with a first network infrastructure device to a second subnet associated with a current network infrastructure device, the wireless client device begins association with the current network infrastructure device, and upon successful association the current network infrastructure device unicasts a first IGMP query message (IGMPQM) to the wireless client device. The first IGMPQM comprises a MAC header including a destination MAC address that is a MAC address of the wireless client device.

In response to the first IGMPQM, the wireless client device can transmit an IGMP report message (IGMPRM) to the current network infrastructure device, and based on the IGMPRM the current network infrastructure device updates an IGMP membership report.

In one implementation, upon receiving the first IGMPQM, the wireless client device can determine whether it has a valid IP address for the second subnet, and if so (e.g., when the wireless client device has a static IP address), the wireless client device transmits the IGMPRM to the current network infrastructure device. By contrast, when the wireless client device determines that it does not have a valid IP address for the second subnet (e.g., it has a dynamic IP address), the wireless client device can ignore the first IGMPQM and obtain a new IP address from a Dynamic Host Configuration Protocol (DHCP) server. In this case, the current network infrastructure device can unicast a second IGMPQM to the wireless client device when the current network infrastructure device receives DHCP acknowledgment (ACK) for the wireless communication device from the DHCP server and forwards the DHCP ACK to the wireless client device. In this case, the wireless client device transmits the IGMPRM to the current network infrastructure device the in response to the second IGMPQM.

Other wireless communication devices that receive the IGMPQMs will determine that the IGMPQM is not addressed to them and will discard the IGMPQMs and will not generate an IGMP report message in response to the IGMPQMs.

Prior to describing some implementations of the embodiments with reference to FIGS. 3-5, an example of a wireless local area network 100 and an example of a wireless switch will be described with reference to FIGS. 1 and 2, respectively.

Figure 1:
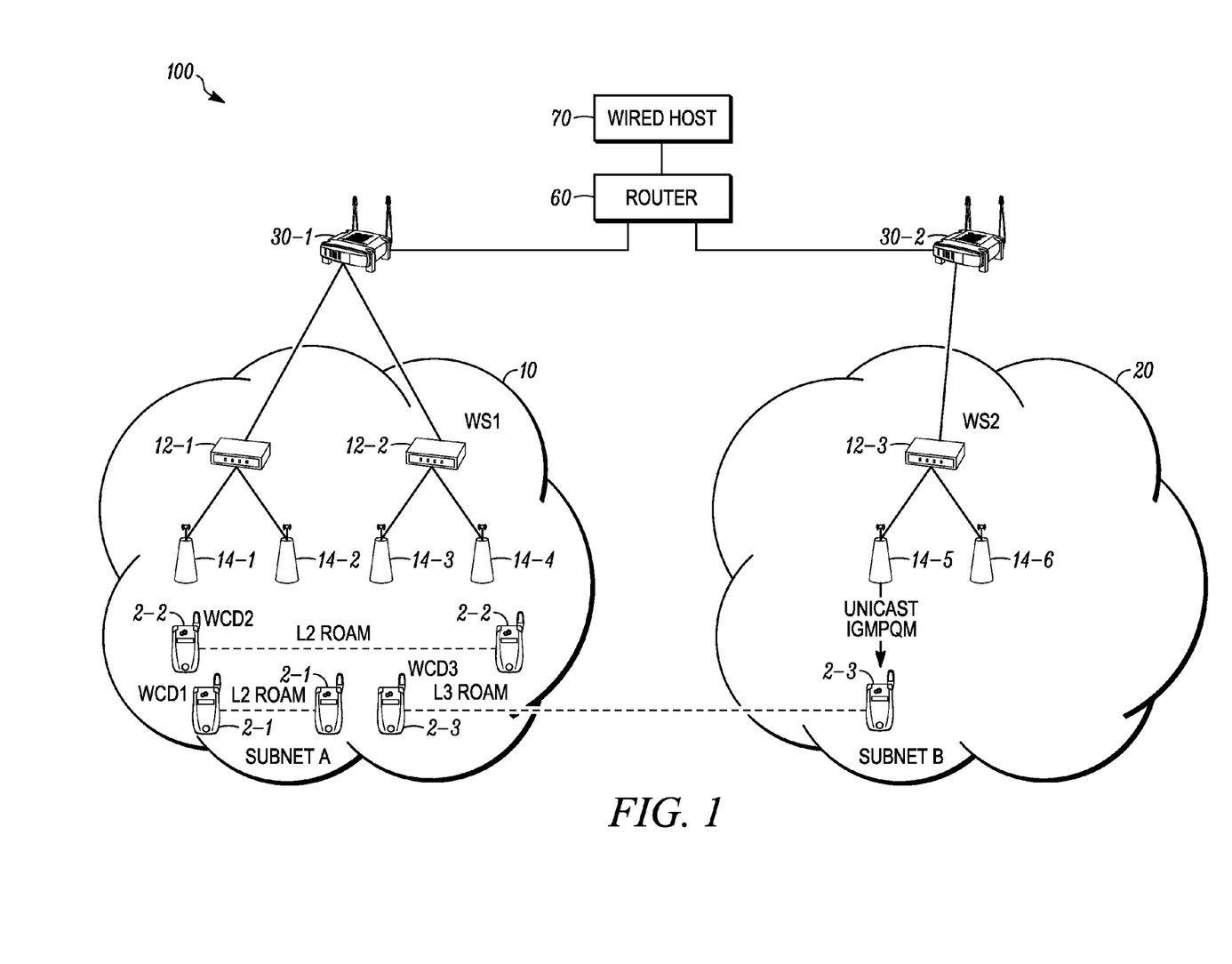
FIG. 1 is a simplified block diagram of a network that can be used in accordance with some embodiments.

FIG. 1 is a simplified block diagram of a network 100. In this particular example, the network 100 includes a wireless local area network (WLAN) that includes wireless client devices 2, and wireless switches 12 that are each coupled to one or more access ports (APs) 14. The network 100 also includes layer 2 (L2) switches 30 coupled to wireless switches 12, a layer 3 (L3) router 60 coupled to the L2 switches 30, and a wired host 70 that is communicatively coupled to the L3 router 60. As used herein, the term "Wireless Local Area Network (WLAN)" refers to a network in which a mobile user can connect to a local area network (LAN) through a wireless (radio) connection. The IEEE 802.11 standards specify some features of exemplary wireless LANs. As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA, and all IEEE standards published at the time this application was filed are incorporated herein by reference in their entirety.

In this particular non-limiting example of one network configuration, the L2 switch 30-1 is coupled to the wireless switches 12-1, 12-2, which are coupled to the access ports (APs) 14-1/14-2 and 14-3/14-4, respectively, and supports a first subnet (A) 10. The L2 switch 30-2 is coupled to the wireless switch 12-3, which is coupled to the APs 14-5, 14-6, and supports the second subnet (B) 20. Each of the L-2 switches 30-1, 30-2 defines its own Virtual Local Area Network (VLAN). As used herein, the term "Virtual Local Area Network (VLAN)" refers to a group of ports on an Ethernet switch that behaves like a separate network segment. VLANs allow networks to be segmented logically without having to be physically rewired. Instead of having all ports on a switch be equal and belong to the same network, ports can be segregated into groups, each belonging to a separate logical network. VLANs subdivide a physical local area network into multiple virtual local area networks or multiple smaller broadcast domains without needing additional network devices, such as routers, to do this. One switch may have several VLANs defined on it. A VLAN is identified using a special identification number called a VLAN ID. Stations attached to switch ports having the same VLAN ID act and function as though they are all on the same physical network segment. The VLAN ID is transmitted in every packet associated with that VLAN.

The wireless switches 12 communicate with the wireless client devices 2 via access ports (APs) 14. The wireless client devices 2 can physically move around the WLAN, and communicate with an IP network via the access ports 14. As used herein, a "wireless client device" can generally refer to a portable or "mobile" wireless communication device or other hardware designed to communicate over a wireless channel. A wireless client device can physically move around, but at any given time may be mobile or stationary. The WCDs 2 illustrated in FIG. 1 can be any one of a number of different types of mobile computing devices, which include without limitation, mobile stations (e.g. mobile telephone handsets, mobile radios, mobile computers, laptop computers, a PC card, personal digital assistants (PDAs), or the like), computers, wireless gaming devices, access terminals, subscriber stations, user equipment, compact flash, external or internal modem, or any other devices configured to communicate via wireless communications. Although not illustrated in FIG. 1, the WCDs 2 can comprise one or more processors/controllers, transceivers, and/or other suitable components. WCDs are well-known in the art and therefore will not be described in detail herein.

Although FIG. 1 illustrates a particular WLAN architecture that employs access ports 14 that are coupled to wireless switches 12, it will be appreciated that other WLAN architectures in which access points are utilized may be implemented without wireless switches. As used herein, the terms "access point" or "access port" both refer to a network-capable device containing a transceiver and antenna for transmitting signals to and receiving signals from the WCDs 2. Access point and access port devices both allow wireless stations to be quickly and easily connected to a wired local area network (LAN) enabling WCDs 2 to communicate with the LAN, and thus provide a "point of access" to the wired network for the WCDs. Although not illustrated in FIG. 1, those skilled in the art will appreciate that each access point or access port device can serve multiple wireless client devices within a defined network area.

While an access point device and an access port device include many similarities, there are significant differences between the two types of devices. One difference is that access ports 14 (sometimes referred to as thin access points) are usually implemented in conjunction with a wireless switch (or other centralized controller). The access ports 14 differ from regular or "fat" access points in that access ports have reduced MAC functionality, whereas regular access points have full MAC functionality. In other words, in a WLAN that implements a wireless switch/access port architecture, many of the higher level MAC functions that would be implemented in an access point are implemented at the wireless switch instead. The wireless switch provides a single point of administration for all thin access ports it configures, controls, manages, and secures the environment for these thin access ports. By contrast, a fat access point is usually implemented without a wireless switch, and has sufficient program logic and processing power to allow it to enforce policies relating to access and usage, rather than working under the supervision of a centralized controller (e.g., wireless switch). A fat access point directly serves as the point of interconnection between the WLAN and a fixed wire network and allows wireless communication devices to be quickly and easily connected to a wired LAN. In the fat access point implementations, the wireless protocol terminates at the access point as opposed to the wireless switch (as is the case in a wireless switch/access port architecture that is illustrated in FIG. 1).

The wireless switch devices 12 are coupled to at least one access port (AP) (and possibly multiple APs). For sake of simplicity, in FIG. 1 each of the wireless switches 12 is shown as having two APs associated therewith. However, it will be appreciated that, while not shown in FIG. 1, each of the wireless switches can have less than two APs or more than two APs associated therewith.

As used herein, the term "wireless switch device" refers to a network entity that configures, controls and manages a plurality of access ports. Examples of wireless switch devices are disclosed in, for example, U.S. Pat. No. 7,173,922, entitled "Multiple wireless local area networks occupying overlapping physical spaces" assigned to the assignee of the present invention, its contents being incorporated by reference in its entirety herein; and U.S. Pat. No. 7,173,923, entitled "Cell Controller Adapted to Perform A Management Function" assigned to the assignee of the present invention, its contents being incorporated by reference in its entirety herein. In U.S. Pat. Nos. 7,173,922, and 7,173,923, a wireless switch is referred to as a cell controller. Wireless switches are also described, for example, in United States Patent Application Publication Number US 2007/0177435A1, filed Jan. 11, 2007, entitled "System For Multiple Wireless Local Area Networks," and assigned to the assignee of the present invention, which is incorporated herein by reference in its entirety; United States Patent Application Publication Number 2007/0109994A1 entitled "Cell Controller For Multiple Wireless Local Area Networks," filed Jan. 11, 2007, which is incorporated by reference herein in its entirety; United States Patent Application Publication Number US20090034470A1, published Feb. 5, 2009, entitled "Forwarding Broadcast/Multicast Data When Wireless Clients Layer 3 Roam Across IP Subnets In A WLAN," and assigned to the assignee of the present invention, which is incorporated herein by reference in its entirety; and U.S. patent application Ser. No. 11/831,781 entitled "Architecture For Seamless Enforcement Of Security Policies When Roaming Across IP Subnets In IEEE 802.11 Wireless Networks," assigned to the assignee of the present invention and filed Jul. 31, 2007, which is incorporated by reference herein in its entirety.

As described, for example, in U.S. Pat. No. 7,173,923, much of the MAC layer functionality that was traditionally provided at a conventional access point can be implemented in the wireless switch device so that "dumb" or "thin" access ports can be used instead of "smart" or "thick" access points. An exemplary wireless switch will be described below with reference to FIG. 2.

The wired Layer 2 (L2) switch devices 30 (also known as an Ethernet switches) are networking devices that operate at Layer 2, sometimes referred to as the Data Link Layer, of the well-known seven layer Open Systems Interconnection (OSI) communication model. A wired L2 switch typically provides wired networking services/functions and features such as Layer 2 Ethernet switching, Layer 3 routing, firewall service, etc. As such, a wired L2 switch typically includes wired input/output interfaces such as Ethernet ports, token ring ports, etc., and includes modules for performing packet forwarding. A wired L2 switch typically receives data packets and forwards them based on information contained in their headers, which for a wired L2 switch are headers corresponding to L2 wired networking protocols including IEEE 802.3 Ethernet, IEEE 802.5 token-ring, etc.

The L3 router 60 provides connectivity to a wired host 70 for the rest of the network. Each interface on the router 60 is associated with an independent IP subnet (e.g. subnet A, subnet B) as shown in FIG. 1. Traffic that goes between interfaces (i.e. between IP subnets) is routed using standard rules of IP. The wired host system 70 can be a multicast server implemented at, for example, a workstation, any application server including mail server, web server, file server, Domain Name System (DNS) server, streaming video server, instant messaging server, gaming server, and the like.

Figure 2:
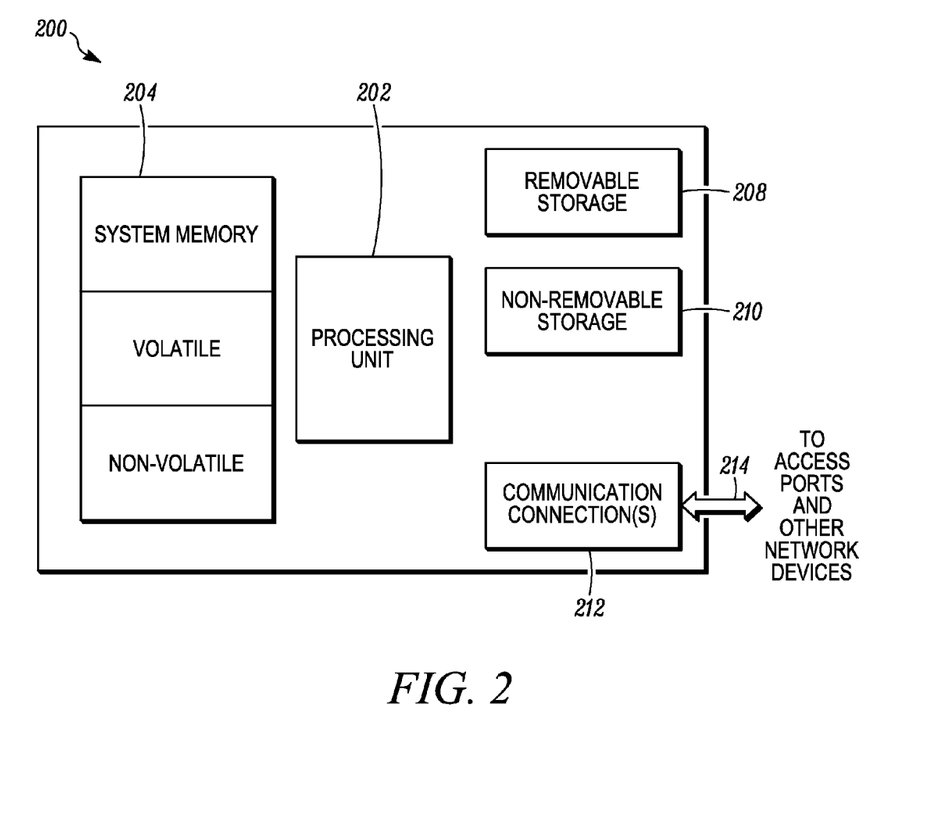
FIG. 2 is a simplified block diagram of a wireless switch in accordance with some embodiments.

FIG. 2 is a simplified block diagram of a wireless switch 200. It will be appreciated by those of ordinary skill in the art that wireless switch 200 is only one example of a wireless switch and is not intended to suggest any limitation as to the scope of use or functionality of the invention. Other well known configurations that may be suitable for use with the invention include, but are not limited to, personal computers (PCs), server computers, multiprocessor systems, microprocessor-based systems, programmable consumer electronics, network PCs, minicomputers, mainframe computers, distributed computing environments that include any of the above systems or devices, and the like.

Wireless switch 200 and certain aspects of embodiments of the invention may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

Wireless switch 200 typically includes at least some form of computer readable media. Computer readable media can be any available media that can be accessed by wireless switch 200 and/or by applications executed by wireless switch 200. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules or other data. Computer storage media includes, but is not limited to, random-access memory (RAM), Read-only memory (ROM), electrically erasable programmable read-only memory (EEPROM), flash memory or other memory technology, Compact Disc Read Only Memory (CD-ROM), digital versatile disks (DVD) or other optical storage, magnetic cassettes, magnetic tape, magnetic disk storage (e.g., hard disks) or other magnetic storage devices (e.g., Magneto resistive Random Access Memory (MRAM)), or any other medium which can be used to store the desired information and which can accessed by wireless switch 200. Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal.

Referring again to FIG. 2, in its most basic configuration, wireless switch 200 typically includes at least one processing unit 202 and memory 204. Depending on the exact configuration and type of computing system 200, memory 204 may be volatile (such as random access memory (RAM)), non-volatile (such as a hard disk, ROM, flash memory, etc.) and most often some combination of the two. Additionally, wireless switch 200 may also have additional features/functionality. For example, wireless switch 200 may also include additional storage (removable and/or non-removable) including, but not limited to, magnetic or optical disks or tape. Such additional storage is illustrated in FIG. 2 by removable storage 208 and non-removable storage 210. Memory 204, removable storage 208, and non-removable storage 210 are all examples of computer storage media as defined above.

Wireless switch 200 also includes communications connection(s) 212 that allow the system to communicate with other network devices, such as access ports (APs) 14 and layer 3 routers 60, over interfaces 214. Communications connection(s) 212 may be associated with the handling of communication media as defined above. In one implementation each communications connection(s) 212 can include one or more network adapters that include transceiver and modem functionality. As used herein, the term "network adapter" can refer to computer hardware designed to allow computers to communicate over a computer network. The network adapters can comprise, for example, a communications modem, wired and/or wireless transceivers, and/or any other devices that can communicate over, for example, an IP network.

A wireless switch device includes wired Ethernet interfaces for a plurality of access ports it supports, and serves as a termination point for a "wireless" protocol, such as the IEEE 802.11 protocol. To explain further, client device(s) communicate with an AP over the air via wireless packets (e.g., IEEE 802.11 data packets), and the AP passes the wireless packets to the wireless switch over a wire that connects the wireless switch and the AP. In other words, the wireless switch communicates wireless packets encapsulated in wired packets (e.g., IEEE 802.11 packets encapsulated in IEEE 802.3 packets) with the AP. A wireless switch device receives data packets, going to or received from one of its connected access ports, and processes those data packets, which would have traditionally been processed by a "thick" access point. A packet forwarding module of a wireless switch device forwards those data packets based on information contained in their L2 headers, which for a wireless switch are headers corresponding to L2 wireless networking protocols including IEEE 802.11, etc. For instance, in the context of IEEE 802.11 networks, a wireless switch decapsulates inbound IEEE 802.11 data packets received from client device via an access port into IEEE 802.3 packets, and converts/encapsulates outbound IEEE 802.3 packets destined for a client device into IEEE 802.11 data packets before passing them on to an AP for transmission to the wireless client device. The wireless switch then Layer-2 switches the resulting 802.3 packet onto the wire. If the 802.3 packet is destined to the wireless switch itself, then the wireless switch routes the IP packet based on its "routing table." In addition to Layer 2 (L2) switching and Layer 3 (L3) or IP routing of data packets, a wireless switch (WS) also performs a number of additional services/functions including, but not limited to, networking services, wireless services, configuration services, security services, administration services, application services, high availability services, packet forwarding services, and system management services.

Examples of the networking services/functions include Layer 2 interface management of physical ports, Layer 3 interface management of IP Interfaces, Domain Name System (DNS) service, Dynamic Host Configuration Protocol (DHCP) Client, DHCP Server, and route-table management. Examples of the wireless services/functions include access port configuration services/functions, access port management services/functions, wireless client device configuration services/functions, wireless client device database management services/functions, WLAN configuration services/functions, WLAN management services/functions, Layer 3 or IP mobility service, and wireless hotspot service. Examples of the configuration services/functions include configuration management, and firmware image management. Examples of the security services/functions 318, 338 include security functions (such as IEEE 802.11i, IP Security (IPsec), Virtual Private Network (VPN), SSL VPNs, DOS Attack detection, Wireless Intrusion Detection System (WIDS) functions, stateful and stateless packet filtering using access-lists, firewall services/functions (e.g., role-based firewall), Authentication/Authorization/Accounting (AAA) client, Remote Authentication Dial In User Service (RADIUS) Server (or a AAA server), user management, and password management. Examples of the administration services/functions include Command Line Interface (CLI), Simple Network Management Protocol (SNMP) server, monitoring, events, alarms, Telnet/secure shell (SSH)/Hypertext Transfer Protocol (HTTP), Hypertext Transfer Protocol over Secure Socket Layer (HTTPS), Trivial File Transfer Protocol (TFTP), File Transfer Protocol (FTP), Secure Copy protocol (SCP), SSH File Transfer Protocol (SFTP) services/functions, certificate management, syslog server, debugging, tracing, and archiving. Examples of the application services/functions include Network Time Protocol (NTP) server, real time locationing system, health checking, and statistics. Examples of the high availability services/functions include Virtual Router Redundancy Protocol (VRRP) and clustering service. Examples of the packet forwarding services/functions include Layer 2 (L2) switching/bridge modules and Layer 3 (L3) or IP routing modules mentioned above, as well as a wireless (IEEE 802.11) packet forwarder module and a flow or session table forwarding module. Examples of the system management services/functions include process monitoring for monitoring all other processes running in the system, Central Processing Unit (CPU) management, and memory management.

Authentication and Association

When a wireless client device (also referred to as a "station") wants to access a WLAN, for example after power-up, sleep mode, or moving to a new area, the wireless client device searches for access points (APs) by scanning The IEEE 802.11 standard defines both passive and active scanning. Passive scanning is mandatory. In passive scanning the wireless client device scans individual channels for beacon frame that are periodically transmitted by the AP. The beacon frame includes synchronization information, and other information about the access point including service set identifier (SSID), supported data rates, etc. Active scanning is optional, and differs from passive scanning in that the wireless client device tries to locate access points and initiates the scanning process by broadcasting a probe request frame. All access points within range respond with a probe response frame. Active scanning enables a wireless client device to receive immediate response from access points, without waiting for transmission of a beacon frame.

When the wireless client device receives a beacon frame it can record information associated with the beacon frame (e.g., corresponding power level and received signal strength) and subsequently use this information to select which access point to communicate through. At the conclusion of the scanning, the WCD generates a scan report that includes parameters for each of the APs that were detected during scanning. For each AP detected the scan report can include a number of parameters.

When the wireless client device decides to join a BSS associated with a particular one of the detected APs, the wireless client device undergoes an authentication process with that AP. The authentication process involves the interchange of information between the AP so that each can prove its identity to the other.

Once the authentication process is complete and the wireless client device is authenticated with the AP, the wireless client device must associate with the access point before sending data frames. The association process involves the exchange of information about capabilities of the wireless client device and the AP. Association is necessary to synchronize the wireless client device and access point with important information, such as supported data rates. The wireless client device initiates the association by sending an association request frame containing elements such as SSID and supported data rates. The access point responds by sending an association response frame containing an association ID along with other information regarding the access point. Once the wireless client device and access point complete the association process, they can send data frames to each other.

When the wireless client device moves about the wireless network or "roams," the wireless client device can often benefit from associating with and communicating through a different access point even though the wireless client device is still within communication range of the access point it is currently associated with. To decide which AP the wireless client device should join and authenticate and associate with as the wireless client device moves about the network, the wireless client device implements an AP selection or "roaming algorithm" to make this decision.

Roaming

Mobility is a key driver in the deployment of wireless networks. WLANs can give wireless client devices the ability to "roam" or physically move from place to place without being connected by wires. In the context of WLANs, the term "roaming" generally describes the physically movement of a wireless client device between APs that are part of the same subnet or between APs that are part of different subnets. FIG. 1 illustrates the concept of the wireless client devices 2-1, 2-2 performing a layer 2 roaming and the concept of wireless client device 2-3 performing layer 3 roaming A layer 2 (L2) network is defined as a single IP subnet and broadcast domain, such as the first subnet (A) 10, while a layer 3 (L3) network is defined as the combination of multiple IP subnets and broadcast domains, such as the first subnet (A) 10 and the second subnet (B) 20.

In a local area network (LAN) or other network, the Media Access Control (MAC) address is a host computer's unique hardware number. A wireless switch device 12 can redirect communications at the layer 2 level, using the destination MAC address of a WCD to determine where to direct the communication.

A WCD 2 continuously listens to nearby APs and can decide to roam if it finds an AP with the same SSID and a stronger signal or is experiencing too much loss with the current AP 14. To initiate a roam, the client 2 sends an associate (or reassociate) request to the new AP 14. It may disassociate from the old AP 14, or the old AP 14 may notice the client 2 is no longer there. As shown in FIG. 1, layer 2 (L2) roaming occurs when WCD 2-1 moves far enough away from its AP 14-1 such that its radio associates with a different AP 14-2 in the same subnet 10. In other words, WCD 2-1 disconnects from AP 14-1 and re-connects to another AP 14-2 in the same subnet (broadcast domain) where several APs use the same Service Set Identifier (SSID); the SSID is a sequence of alphanumeric characters (letters or numbers) which specify the name of a wireless local area network (WLAN) and allows one wireless network to be clearly distinguishable from another. Similarly, L2 roaming also occurs when WCD 2-2 moves far enough away from its AP 14-1 such that its radio associates with a different AP 14-4 in the same subnet (even though on a different wireless switch 12-2). WCD 2-2 disconnects from AP 14-1 and re-connects to another AP 14-4 in the same subnet 10.

With layer 2 (L2) roaming, APs inside a given subnet share the same Extended Service Set (ESS), and although the physical point of attachment (the AP) changes, because the original and the new AP offer coverage for the same IP subnet, the device's IP address is still valid after the roam and can remain unchanged. For example, when the wireless client device 2 roams within the first subnet (A) 10, the IP address of the wireless client device 2 will remain the same.

After the wireless client devices 2 successfully roam, LAN traffic for the wireless client device 2 can be relayed through the new AP. However, because the scalability of subnets is limited by the number of APs and clients that can be supported within a given subnet, in some situations the client, such as WCD 2-3, roams to a new AP, such as AP 14-5, in a different or foreign subnet supported by another wireless switch, such as WS 12-3.

As illustrated in FIG. 1, layer 3 (L3) roaming occurs when a wireless client device 2-3 moves from an AP 14-3 within its home IP subnet, such as the first subnet (A) 10, to a new AP 14-5 within a foreign IP subnet, such as the second subnet (B) 20. This foreign IP subnet has a different Basic Service Set (BSS) than the home IP subnet. The wireless client device 2-3 disconnects from one AP 14-3 and reconnects or re-associates with another foreign AP 14-5 in a foreign IP subnet outside its home IP subnet. In this re-association, the wireless client device 2-3 is supposed to be served by a different access router (through the foreign AP), which bares a different IP address, while the wireless client device 2-3 itself preserves its original IP address. Because the wireless client device cannot be identified by its original home IP address anymore, to maintain an IP-connection while roaming, a new IP address is required for the routing the client's IP data. Various mechanism for seamlessly obtaining a new IP address which is valid in the new subnet, are described, for example, in United States Patent Application Publication Number US20090034470A1, published Feb. 5, 2009, entitled "Forwarding Broadcast/Multicast Data When Wireless Clients Layer 3 Roam Across IP Subnets In A WLAN," and assigned to the assignee of the present invention, which is incorporated herein by reference in its entirety.

When WCD 2-3 L3 belongs to a particular multicast group and roams to a new subnet B 20 associated with a new wireless switch 12-3, delivery of the IGMP query message to that WCD 2-3 can not be guaranteed. If an IGMP Snooping Table maintained by the new wireless switch 12-3 is not be up-to-date (i.e., to reflect the multicast membership of WCD 2-3), this can prevent delivery of a multicast IGMP query message to WCD 2-3 and multicast traffic stream(s) that should be received by WCD 2-3 can be interrupted.

Overview

In accordance with the disclosed embodiments, the reliability of an IGMP query message sent to a WCD 2-3 is improved so that multicast membership tables maintained at the current wireless switch 12-3 can be updated with more accurate information. This increases the chances that multicast traffic stream(s) that should be received by WCD 2-3 will not be interrupted even when WCD 2-3 has just recently roamed to subnet B 20. Various implementations of the disclosed embodiments will now be described below with reference to FIGS. 3-6.

Figure 3:
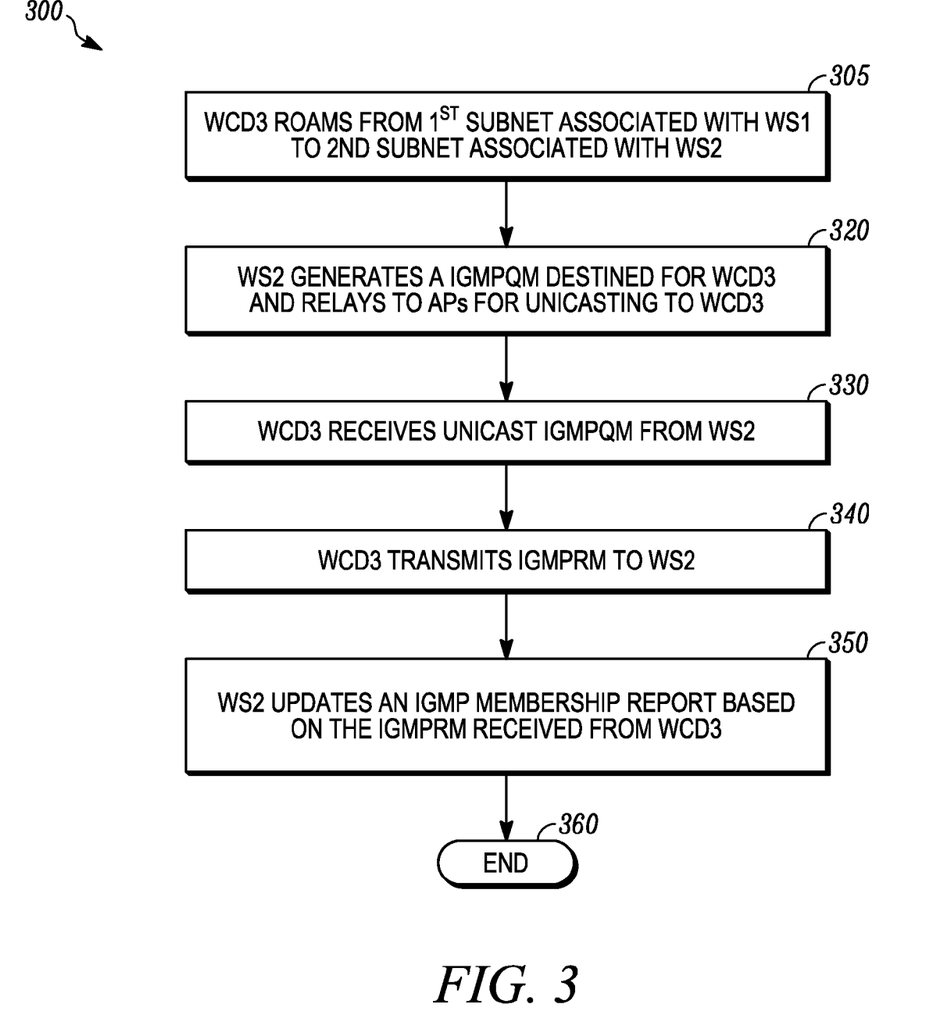
FIG. 3 is a flowchart illustrating a method for updating an IGMP membership report when a wireless client device roams to a new or "current" wireless switch in accordance with some embodiments.

FIG. 3 is a flowchart illustrating a method 300 for updating an IGMP membership report when a wireless client device roams to a new or "current" wireless switch in accordance with some embodiments. In one implementation, the processing performed by the wireless switch can be implemented in dataplane code that executes on a processor of the wireless switch. FIG. 3 will now be described below with reference to the network 100 that is illustrated in FIG. 1; however, it will be appreciated that the method 300 can be applied in other network configuration whenever a wireless client device roams between wireless switches or layer 3 roams between subnets.

The method 300 begins at step 305, when WCD 2-3 roams from a first subnet A 10 associated with its home wireless switch (WS) 12-2 to a second subnet B 20 associated with a current WS 12-3. As used herein, the term "current switch (CS)" refers to a wireless switch that the WCD 2-3 is currently associated with. The current wireless switch for the WCD 2-3 is the switch in the mobility domain to which it is currently associated to, and keeps changing as the WCD 2-3 continues to roam between different WSs.

At step 320, the current WS 12-3 generates a "unicast" IGMP query message (IGMPQM) that is destined for WCD 2-3 (i.e., a IGMP query message with a destination MAC address of the WCD 2-3), and relays the IGMPQM to its associated APs 14-5, 14-6 to be transmitted over-the-air or "unicast" to WCD 2-3. Because the IGMP query message is unicast, it is always sent when wireless media is free for a transmission and is acknowledged by the receiver. If an acknowledgement is not received it will be retransmitted until an acknowledgement (ACK) is received from WCD 2-3. As such, delivery of the unicast packet is more reliable than in the case of a multicast IGMPQM. In addition, because the IGMP query message is unicast, it will be processed only by WCD 2-3 and will be discarded by other WCDs (not shown) that receive it.

When the WCD 12-3 receives the IGMPQM from WS2 12-3 (step 330), the WCD 12-3 (and only WCD 2-3) transmits an IGMP report message (IGMPRM) to WS 12-3 at step 340. At step 350, WS2 12-3 receives the IGMPRM transmitted from the WCD 2-3 (and only from WCD 2-3) and updates its IGMP membership report based on information in that IGMPRM. As such, the current wireless switch 12-3 can update and maintain its multicast membership table (also referred to as an IGMP snooping table) with the multicast membership information for that roamed WCD 2-3 without being flooded by IGMP report messages from other WCDs. In other words, the unicast IGMP query message will not trigger generation of IGMP report messages by other WCDs that receive it. Method 300 ends at step 360.

Because the multicast membership information is kept up to date, this helps ensure that the newly associated or roamed WCD 2-3 continues to receive appropriate multicast traffic stream(s) without interruption even when roaming.

One particular implementation of a method for updating an IGMP membership report when a wireless client device roams to a new or "current" wireless switch will now be described with reference to FIGS. 4 and 5.

Figure 4:
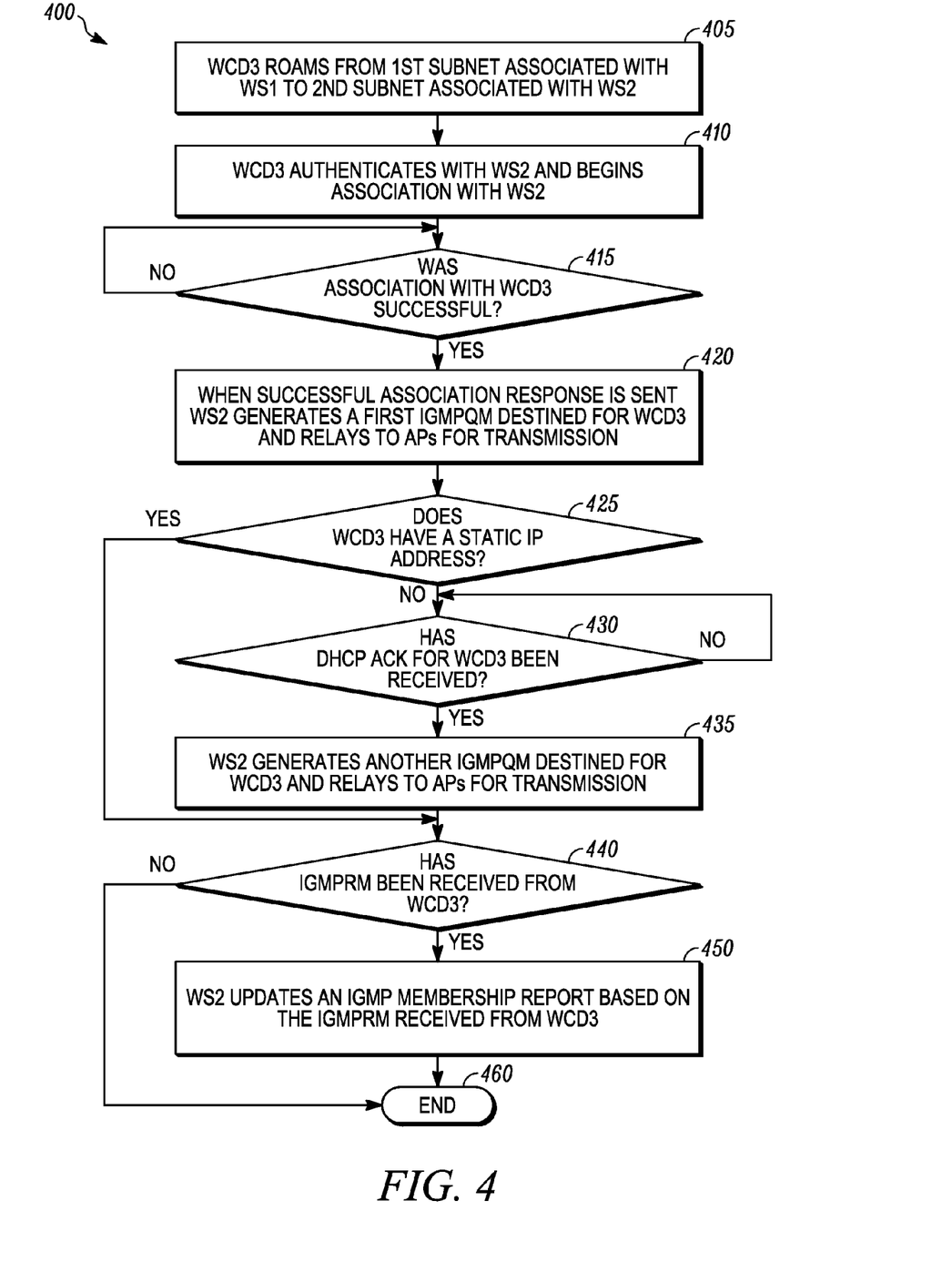
FIG. 4 is a flowchart illustrating processing performed at a wireless switch in a method for updating an IGMP membership report when a wireless client device roams to that wireless switch in accordance with one embodiment.
Figure 5:
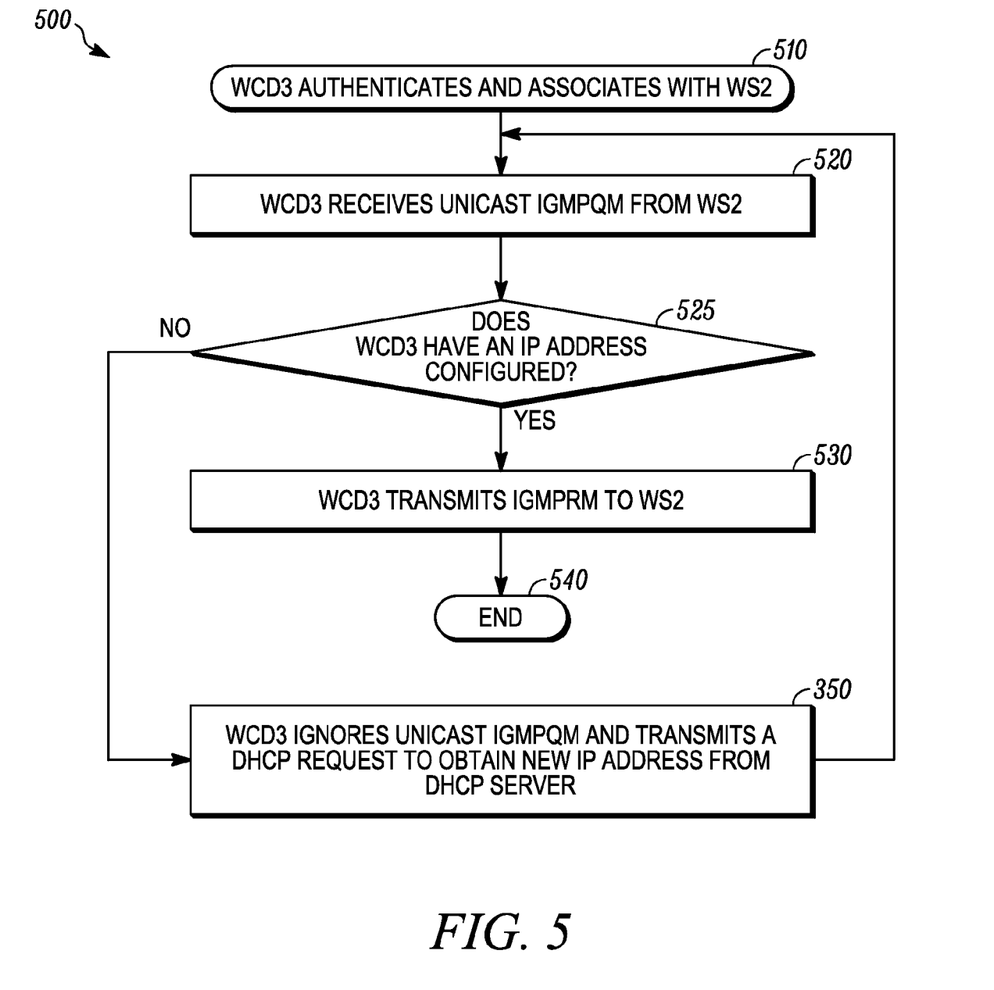
FIG. 5 is a flowchart illustrating a method for processing a unicast IGMP query message (IGMPQM) at the wireless client device in accordance with one embodiment.

FIG. 4 is a flowchart illustrating processing performed at a wireless switch in a method 400 for updating an IGMP membership report when a wireless client device roams to that wireless switch in accordance with one implementation. FIG. 5 is a flowchart illustrating a method 500 for processing a unicast IGMP query message (IGMPQM) (transmitted by the wireless switch) at the wireless client device in accordance with one implementation. As above, FIGS. 4 and 5 will now be described below with reference to the network 100 that is illustrated in FIG. 1; however, it will be appreciated that the method 400, 500 can be applied in other network configurations.

Referring to FIG. 4, the method 400 begins at step 410 when a WCD 2-3 roams from a first subnet A 10 associated with a WS 12-2 to a second subnet B 20 associated with a current WS 12-3. At step 410, WCD 2-3 authenticates with the current WS 12-3 and upon successfully authenticating begins associating with the current WS 12-3.

At step 415, the current WS 12-3 monitors the status of the association process until it determines that association was successful (e.g., whether it has sent a successful association response to the WCD 2-3).

When the current WS 12-3 determines that association was successful (e.g., that it has sent a successful association response to the WCD 2-3), at step 420, the current WS 12-3 generates a "first" IGMP query message (IGMPQM) destined for the WCD 2-3, and relays the first IGMPQM to one or more of its access ports (e.g., access port 14-5, 14-6) for transmission over the air to WCD 2-3. As above, the IGMPQM is a unicast message that is destined for WCD 2-3 (i.e., a IGMP query message with a destination MAC address of the WCD 2-3). As also noted above, because the IGMP query message is unicast, it will be processed only by WCD 2-3 and will be discarded by other WCDs (not shown) that receive it. Other details regarding the IGMPQM will be described below with reference to FIG. 6.

As will be explained below, upon receiving the first IGMPQM, the WCD 2-3 will determine whether it has a valid IP address for the second subnet B 20, and if so will transmit, an IGMP report message (IGMPRM) to the current WS 12-3 in response to the first IGMPQM. For example, when the WCD 2-3 has a static IP address configured, upon receiving the first IGMPQM, the WCD 2-3 will determine that it has a valid IP address for the second subnet B 20, and will transmit an IGMPRM to the current WS 12-3 in response to the first IGMPQM. The IGMPRM comprises an IGMP version number (IGMPVN) supported by the WCD 2-3 and an IP header comprising a destination IP address. For example, if the WCD 2-3 supports IGMP version 1 or 2 (IGMP v1 or IGMP v2), then the destination IP address is the multicast IP address which WCD 2-3 wants to join. If the WCD 2-3 supports IGMP version 3 (IGMP v3), then the destination IP address is 224.0.0.22 to which all IGMP v3 capable multicast routers listen. Further if the WCD 2-3 supports IGMP version 3 (IGMP v3), then the IGMPRM further comprises a list of multicast addresses for which it wants to join the multicast group. More details can be found in RFC 4376.

On the other hand, if the WCD 2-3 does not have a valid IP address when it receives the first IGMPQM (e.g., the WCD 2-3 has a dynamically assigned IP address that has not yet been updated and assigned by a DHCP server for the second subnet B 20), then WCD 2-3 will not send a response to the first IGMPQM, but will instead ignore it (i.e., will not send a IGMPRM in response to the first IGMPQM) and will wait for a second IGMPQM that will be sent after WCD 2-3 has obtained a new IP address from a DHCP server. (As an aside, it is noted that when WCD 2-3 roams across a boundary between the first subnet (A) 10 and the second subnet (B) 20 and the Dynamic Host Configuration Protocol (DHCP) is enabled on the WCD 2-3, then the WCD 2-3 can transmit a DHCP request to a DHCP server obtain a new IP address of the second subnet (B) 20; the DHCP server responds with a DHCP acknowledgment (ACK) to the WCD 2-3. As used herein, the "Dynamic Host Configuration Protocol (DHCP)" refers to a protocol for assigning dynamic IP addresses to devices on a network. DHCP allows a device to have a different IP address every time it connects to the network, and the device's IP address can even change while it is still connected. DHCP can also support a mix of static and dynamic IP addresses. DHCP uses the concept of a "lease" or amount of time that a given IP address will be valid for a computer. Using very short leases, DHCP can dynamically reconfigure networks in which there are more computers than there are available IP addresses. A DHCP server sends WCD 2-3 a new IP address when in response to a request by the WCD 2-3.)

As such, at step 425, the current WS 12-3 determines whether WCD 2-3 has a static IP address or a dynamic IP address. This knowledge can be obtained by the current WC 12-3 during authentication/association from either WCD 2-3 or the home wireless witch 12-2. When the current WS 12-3 determines that the WCD 2-3 has a static IP address, the method 400 proceeds to step 440 as will be described below. When the current WS 12-3 determines that the WCD 2-3 has a dynamic IP address, the method 400 proceeds to step 430, where the current WS 12-3 monitors the status of the DHCP operation until it determines that a DHCP acknowledgment (ACK) has been received for WCD 2-3 from the DHCP server and relayed to WCD 2-3 to confirm that WCD 2-3 has obtained a new IP address.

When the current WS 12-3 determines that DHCP ACK has been received for WCD 2-3 and relayed to WCD 2-3 (i.e., that the WCD 2-3 has obtained the new IP address, the method 400 proceeds to step 435, where the current WS 12-3 generates a "second" IGMPQM destined for the WCD 2-3, and relays the first IGMPQM to one or more of its access ports (e.g., access port 14-5, 14-6) for transmission over the air to WCD 2-3. As above, the second IGMPQM is a unicast message that is destined for WCD 2-3 (i.e., a IGMP query message with a destination MAC address of the WCD 2-3). As also noted above, because the second IGMP query message is unicast, it will be processed only by WCD 2-3 and will be discarded by other WCDs (not shown) that receive it. The method 400 then proceeds to step 440.

Although not illustrated in FIG. 4, it will be appreciated that, in response to one of the IGMPQMs, the WCD 2-3 will eventually transmit an IGMP report message (IGMPRM) to the current WS 12-3, as will be described below with reference to FIG. 5. At step 440, the current WS 12-3 monitors the status of the IGMP response from WCD 2-3 until it determines that an IGMP report message (IGMPRM) has been received from WCD 2-3 (in response to either the first or the second IGMPQM). If the current WS 12-3 determines that an IGMPRM has not been received from WCD 2-3, method 400 ends at step 460.

When current WS 12-3 determines that an IGMPRM has been received from the WCD 2-3, the method 400 proceeds to step 450, where the current WS 12-3 updates an IGMP membership report (maintained at the current WS 12-3) based on the IGMPRM received from the WCD 2-3.

One implementation of a method 500 for processing a unicast IGMP query message (IGMPQM) (transmitted by the wireless switch 12-3) at the wireless client device 2-3 will now be described with reference to FIG. 5.

After the WCD 2-3 authenticates and associates with the current WS 12-3 (step 510), the method 500 begins at step 520 when WCD 2-3 receives a "unicast" IGMPQM from the current WS 12-3. This can be either the first IGMPQM transmitted at step 420 or a subsequent IGMPQM that is transmitted (or retransmitted) at step 435.

At step 525, WCD 2-3 determines whether it has a valid IP address configured for subnet B 20.

When WCD 2-3 determines that it has a valid IP address configured for subnet B 20, WCD 2-3 generates and transmits an IGMPRM over the air that is destined for the current WS 12-3, and the method then ends at step 540.

When WCD 2-3 determines that it does not have a valid IP address configured for subnet B 20, the method 500 proceeds to step 535, where the WCD 2-3 ignores the IGMPQM and transmits a DHCP request for a new IP address, and method 500 loops back to step 520, where processing of steps 520 and 525 repeats. This loop continues until WCD 2-3 determines that it has a valid IP address configured for subnet B 20 at step 525, at which point the WCD 2-3 generates and transmits an IGMPRM over the air that is destined for the current WS 12-3, and the method then ends at step 540.

Figure 6:
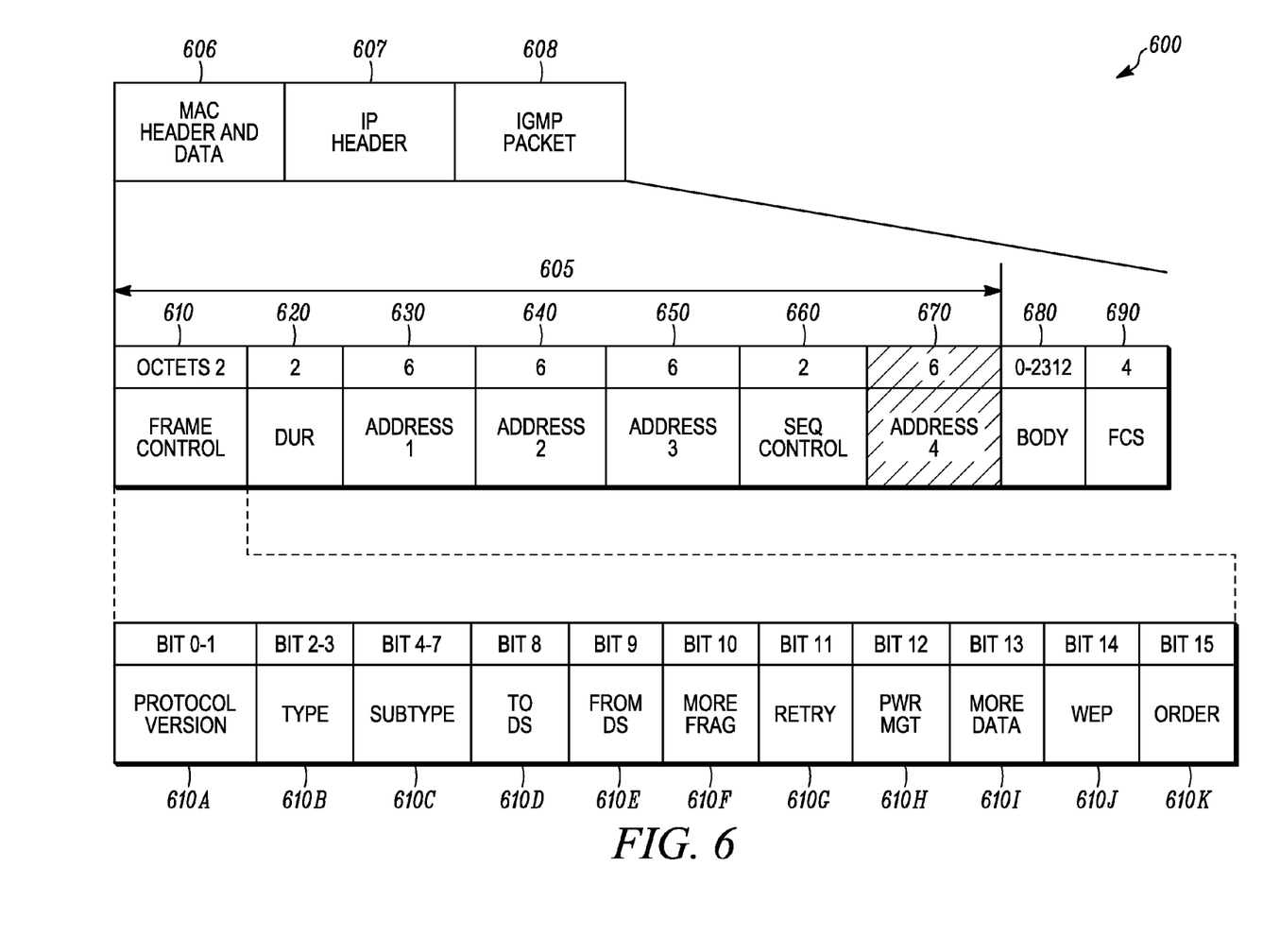
FIG. 6 illustrates a data structure of a unicast IGMPQM transmitted by the wireless switch to the wireless client device in accordance with one embodiment.

FIG. 6 illustrates a data structure of a unicast IGMP query message (IGMPQM) 600 transmitted by the wireless switch 12-3 to the wireless client device 2-3 in accordance with one embodiment of the present invention. The IGMPQM 600 comprises a Media Access Control (MAC) packet 606, an Internet Protocol version 4 (IPv4) packet header 607 and an IGMP packet 608.

The MAC packet 606 includes a MAC header 605 and MAC data that includes a packet body field 680 and a frame check sum field (FCS) 690.

The MAC header 605 comprises a frame control field 610, a duration field 620, address fields 630-665, and a sequence control field 660. In a conventional IGMPQM, ADDRESS 1 630 (the destination address) is set to a multicast MAC address for a particular multicast group (i.e., a multicast MAC address corresponding to all WCDs belonging to a particular multicast group so that the IGMPQM is processed and responded to by all WCDs belonging to that particular multicast group with a IGMPRM)). In accordance with the unicast IGMPQM of the disclosed embodiments, ADDRESS 1 630 (the destination address) is set to the MAC address of the wireless client device 2-3 (i.e., is a unicast MAC address corresponding to the WCD 2-3 so that the first IGMPQM is processed only by the WCD 2-3)). ADDRESS 2 640 (the Basic Service Set Identifier (BSSID)) is set to the MAC address of the access port. ADDRESS 3 650 (the source address) is set to the MAC address of the current wireless switch. ADDRESS 6 665 is shown in shading since it is included in only in Wireless Distribution System (WDS) type data frames. The Frame Control field 610 comprises a protocol version sub-field 610A, a type sub-field 610B, a subtype sub-field 610C, a ToDS bit 610D, a FromDS bit 610E, a more fragment bit 610F, a retry bit 610G, a power management bit 610H, a more data bit 610I, a WEP bit 610J and an order bit 610K. In the IGMPQM packet, the ToDS bit is set to 0 (i.e., meaning that the packet is destined to a BSS station), and the FromDS bit is set to 1 since the traffic from the AP to a BSS station (i.e., WCD 2-3).

The body field 680 comprises data or "payload" information. The FCS field 690 contains a cyclic redundancy check to detect errors in the frame which may have occurred during transmission.

Internet Protocol version 4 (IPv4) is the fourth revision of the Internet Protocol (IP) and is described in IETF publication RFC 791 (September 1981), which is incorporated herein by reference in its entirety. Although not illustrated, it will be appreciated that IPv4 packet header 606 will include (among other things) a protocol field and addresses including a source IP address which indicates the sender of the IGMPQM and a destination IP address which indicates the receiver of the IGMPQM. The protocol field defines or indicates the next level protocol used in the data portion of the IP datagram. Here, the value of the protocol field is set to a value of 2 to indicate IGMP. As used herein, the term "destination Internet Protocol (IP) address" refers to a layer 3 address, and can be a number which identifies each receiver of information packets across the Internet. The destination IP address set to 224.0.0.1 and the first four bits of the destination IP address will be set to 1110 (in that order) to indicate that it is a multicast IP packet. 224.0.0.1 is the All Hosts multicast group that contains all systems on the same network segment. The source IP address is set to the address of a multicast router which is connected in the current WS 12-3.

In the foregoing specification, specific embodiments have been described. However, one of ordinary skill in the art appreciates that various modifications and changes can be made without departing from the scope of the invention as set forth in the claims below. For example, while the techniques and technologies described above have been described in the context of WLANs which in include wireless switches and access ports (APs), it will be appreciated that these techniques and technologies can also be applied in environments were wireless switches are not utilized or where the functionality of the wireless switch is implemented within an access point. For instance, these techniques and technologies can be applied in a network which does not include wireless switches—this case is identical to a Wireless switch with one AP merged together.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method, comprising:
  associating with a current wireless switch at a wireless client device when the wireless client device roams from a first subnet associated with a first wireless switch to a second subnet associated with the current wireless switch;

determining at the current wireless switch whether association with the wireless client device was successful;

generating a first IGMP query message (IGMPQM) destined for the wireless client device at the current wireless switch when the wireless client device successfully associates with the current network infrastructure device, wherein a MAC destination address of the first IGMPQM is a MAC address of the wireless client device;

sending the first IGMPQM from the current wireless switch to one or more access ports associated with the current wireless switch;

transmitting the first IGMPQM from the one of more access ports over a wireless communication channel to the wireless communication device;

determining, at the wireless client device, whether the wireless client device has a valid IP address for the second subnet;

ignoring the first IGMPQM at the wireless client device when the wireless client device determines that it does not have a valid IP address for the second subnet;

obtaining, at the wireless client device, a new IP address from a DHCP server;

generating a second IGMP query message (IGMPQM) destined for the wireless client device at the current wireless switch when the current wireless switch receives a DHCP acknowledgment (ACK) for the wireless communication device from a DHCP server and forwards the DHCP ACK to the wireless client device, wherein a MAC destination address of the second IGMPQM is a MAC address of the wireless client device; and sending the second IGMPQM from the current wireless switch to one or more access ports associated with the current wireless switch;

transmitting the second IGMPQM from the one of more access ports over a wireless communication channel to the wireless communication device; and receiving the second IGMPQM at the wireless client device.

2. The method according to claim 1, further comprising:
transmitting, from the wireless client device in response to the second IGMPQM, an IGMP report message (IGMPRM) to the current wireless switch; and
updating, based on the IGMPRM received from the wireless client device, an IGMP membership report at the current wireless switch.

3. The method according to claim 2, wherein a plurality of other wireless communication devices are located within transmission range of access ports coupled to the current wireless switch, wherein the wireless communication device and the plurality of other wireless communication devices each belong to a particular multicast group, and further comprising:
receiving the first IGMPQM at the plurality of other wireless communication devices;
determining at each of the other plurality of wireless communication devices that the first IGMPQM is not addressed to each of the other plurality of wireless communication devices; and
discarding the first IGMPQM at each of the other plurality of wireless communication devices except for the wireless communication device, wherein each of the other plurality of wireless communication devices do not generate an IGMP report message in response to the first IGMPQM.

4. The method according to claim 2, further comprising:
receiving the first IGMPQM at the wireless client device;
determining, at the wireless client device, whether the wireless client device has a valid IP address for the second subnet; and
wherein the step of transmitting, from the wireless client device, an IGMP report message (IGMPRM) to the current wireless switch, comprises:
transmitting, from the wireless client device in response to the first IGMPQM, an IGMP report message (IGMPRM) to the current wireless switch when the wireless client device determines that the wireless client device has a valid IP address for the second subnet.

5. The method according to claim 1, further comprising:
determining at the current wireless switch whether the wireless communication device has a static IP address or a dynamic IP address;
when the current wireless switch determines that the wireless communication device has a dynamic IP address, monitoring a status of a DHCP operation at the current wireless switch until a DHCP acknowledgment (ACK) has been received for the wireless communication device to confirm that the wireless communication device has obtained a new IP address;
monitoring a status of an IGMP response from the wireless communication device at the current wireless switch until an IGMP report message (IGMPRM) has been received from the wireless communication device.

6. The method according to claim 1, wherein the first IGMPQM comprises a MAC header including a destination MAC address, where the destination MAC address is a MAC address of the wireless client device.

7. A wireless local area network, comprising:
a first wireless switch that defines a first subnet;
a current wireless switch that defines a second subnet; and
a wireless client device operable to be initially associated with the first wireless switch, wherein the wireless client device is operable to associate with the current wireless switch when the wireless client device roams from the first subnet to the second subnet, and
wherein the current wireless switch is operable to unicast a first IGMP query message (IGMPQM) to the wireless client device from the current wireless switch upon successful association with the wireless client device,
wherein the wireless client device is further operable to determine whether the wireless client device has a valid IP address for the second subnet, ignore the first IGMPQM when the wireless client device determines that it does not have a valid IP address for the second subnet, obtain a new IP address from a DHCP server;
wherein the current wireless switch is further operable to unicast a second IGMP query message (IGMPQM) to the wireless client device when the current wireless switch receives DHCP acknowledgment (ACK) for the wireless communication device from a DHCP server and forward the DHCP ACK to the wireless client device;
wherein the wireless client device is further operable to receive the second IGMPQM and transmit, in response to the second IGMPQM, an IGMP report message (IGMPRM) to the current wireless switch; and
wherein the current wireless switch is further operable to update, based on the IGMPRM received from the wireless client device, the IGMP membership report.

8. A method for updating an IGMP membership report, the method comprising:

associating with a current network infrastructure device at a wireless client device when the wireless client device roams from a first subnet associated with a first network infrastructure device to a second subnet associated with the current network infrastructure device;

unicasting a first IGMP query message (IGMPQM) to the wireless client device from the current network infrastructure device when the wireless client device successfully associates with the current network infrastructure device;

determining, at the wireless client device, whether the wireless client device has a valid IP address for the second subnet;

ignoring the first IGMPQM at the wireless client device when the wireless client device determines that it does not have a valid IP address for the second subnet;

obtaining, at the wireless client device, a new IP address from a DHCP server;

unicasting a second IGMP query message (IGMPQM) to the wireless client device from the current network infrastructure device when the current network infrastructure device receives DHCP acknowledgment (ACK) for the wireless communication device from a DHCP server and forwards the DHCP ACK to the wireless client device; and receiving the second IGMPQM at the wireless client device;

transmitting, from the wireless client device in response to the second IGMPQM, an IGMP report message (IGMPRM) to the current network infrastructure device; and updating, based on the IGMPRM received from the wireless client device, the IGMP membership report at the current network infrastructure device.

9. The method according to claim 8, wherein the first IGMPQM comprises a MAC header including a destination MAC address, where the destination MAC address is a MAC address of the wireless client device.

10. The method according to claim 9, wherein the first IGMPQM comprises an IP header including a first destination IP address set to 224.0.0.1 and a source IP address of a multicast router which is connected in the network infrastructure device.

11. The method according to claim 8, wherein the IGMPRM further comprises an IGMP version number supported by the wireless client device.

12. The method according to claim 8, further comprising:
receiving the first IGMPQM at the wireless client device;
determining, at the wireless client device, whether the wireless client device has a valid IP address for the second subnet; and
wherein the step of transmitting, from the wireless client device, an IGMP report message (IGMPRM) to the current network infrastructure device, comprises:
transmitting, from the wireless client device in response to the first IGMPQM, an IGMP report message (IGMPRM) to the current network infrastructure device when the wireless client device determines that the wireless client device has a valid IP address for the second subnet.

13. The method according to claim 8, further comprising:
determining at the current network infrastructure device whether association with the wireless client device was successful.

14. The method according to claim 13, wherein the current network infrastructure device comprises a current wireless switch, and wherein the step of unicasting a first IGMP query message (IGMPQM) to the wireless client device from the current wireless switch when the wireless client device successfully associates with the current network infrastructure device, comprises the steps of:

generating a first IGMP query message (IGMPQM) destined for the wireless client device at the current wireless switch when the current wireless switch successfully associates with the wireless client device, wherein a MAC destination address of the first IGMPQM is a MAC address of the wireless client device; and sending the first IGMPQM from the current wireless switch to one or more access ports associated with the current wireless switch; and transmitting the first IGMPQM from the one of more access ports over a wireless communication channel to the wireless communication device.

15. The method according to claim 14, further comprising:
determining at the current wireless switch whether the wireless communication device has a static IP address or a dynamic IP address; and
when the current wireless switch determines that the wireless communication device has a dynamic IP address, monitoring a status of a DHCP operation at the current wireless switch until a DHCP acknowledgment (ACK) has been received for the wireless communication device to confirm that the wireless communication device has obtained a new IP address.

16. The method according to claim 15, wherein the step of unicasting a second IGMP query message (IGMPQM) to the wireless client device from the current wireless switch when the current wireless switch receives a DHCP acknowledgment (ACK) for the wireless communication device from a DHCP server and forwards the DHCP ACK to the wireless client device, comprises the steps of:

generating a second IGMP query message (IGMPQM) destined for the wireless client device at the current wireless switch when the current wireless switch receives a DHCP acknowledgment (ACK) for the wireless communication device from a DHCP server and forwards the DHCP ACK to the wireless client device, wherein a MAC destination address of the second IGMPQM is a MAC address of the wireless client device; and sending the second IGMPQM from the current wireless switch to one or more access ports associated with the current wireless switch; and transmitting the second IGMPQM from the one of more access ports over a wireless communication channel to the wireless communication device.

17. The method according to claim 16, further comprising:
monitoring a status of an IGMP response from the wireless communication device at the current wireless switch until an IGMP report message (IGMPRM) has been received from the wireless communication device.

18. The method according to claim 8, wherein the current network infrastructure device comprises a current wireless switch, and wherein a plurality of other wireless communication devices are located within transmission range of access ports coupled to the current wireless switch, wherein the wireless communication device and the plurality of other wireless communication devices each belong to a particular multicast group, and further comprising:

receiving the first IGMPQM at the plurality of other wireless communication devices;

determining at each of the other plurality of wireless communication devices that the first IGMPQM is not addressed to each of the other plurality of wireless communication devices; and discarding the first IGMPQM at each of the other plurality of wireless communication devices except for the wireless communication device, wherein each of the other plurality of wireless communication devices do not generate an IGMP report message in response to the first IGMPQM.

* * * * *

UNITED STATES PATENT AND TRADEMARK OFFICE
CERTIFICATE OF CORRECTION

| | | |
|---|---|---|
| PATENT NO. | : 8,391,240 B2 | Page 1 of 1 |
| APPLICATION NO. | : 12/648834 | |
| DATED | : March 5, 2013 | |
| INVENTOR(S) | : Solanki et al. | |

It is certified that error appears in the above-identified patent and that said Letters Patent is hereby corrected as shown below:

In The Specification

In Column 10, Line 55, delete "scanning" and insert -- scanning. --, therefor.

In Column 11, Line 53, delete "roaming" and insert -- roaming. --, therefor.

In Column 12, Line 47, delete "bares" and insert -- bears --, therefor.

In Column 16, Line 47, delete "IGMPRM))." and insert -- IGMPRM). --, therefor.

In Column 16, Line 52, delete "2-3))." and insert -- 2-3). --, therefor.

In The Claims

In Column 20, Line 46, in Claim 7, delete "device from the current wireless switch upon" and insert -- device upon --, therefor.

Signed and Sealed this
Eighteenth Day of November, 2014

Michelle K. Lee
*Deputy Director of the United States Patent and Trademark Office*